UNITED STATES PATENT OFFICE.

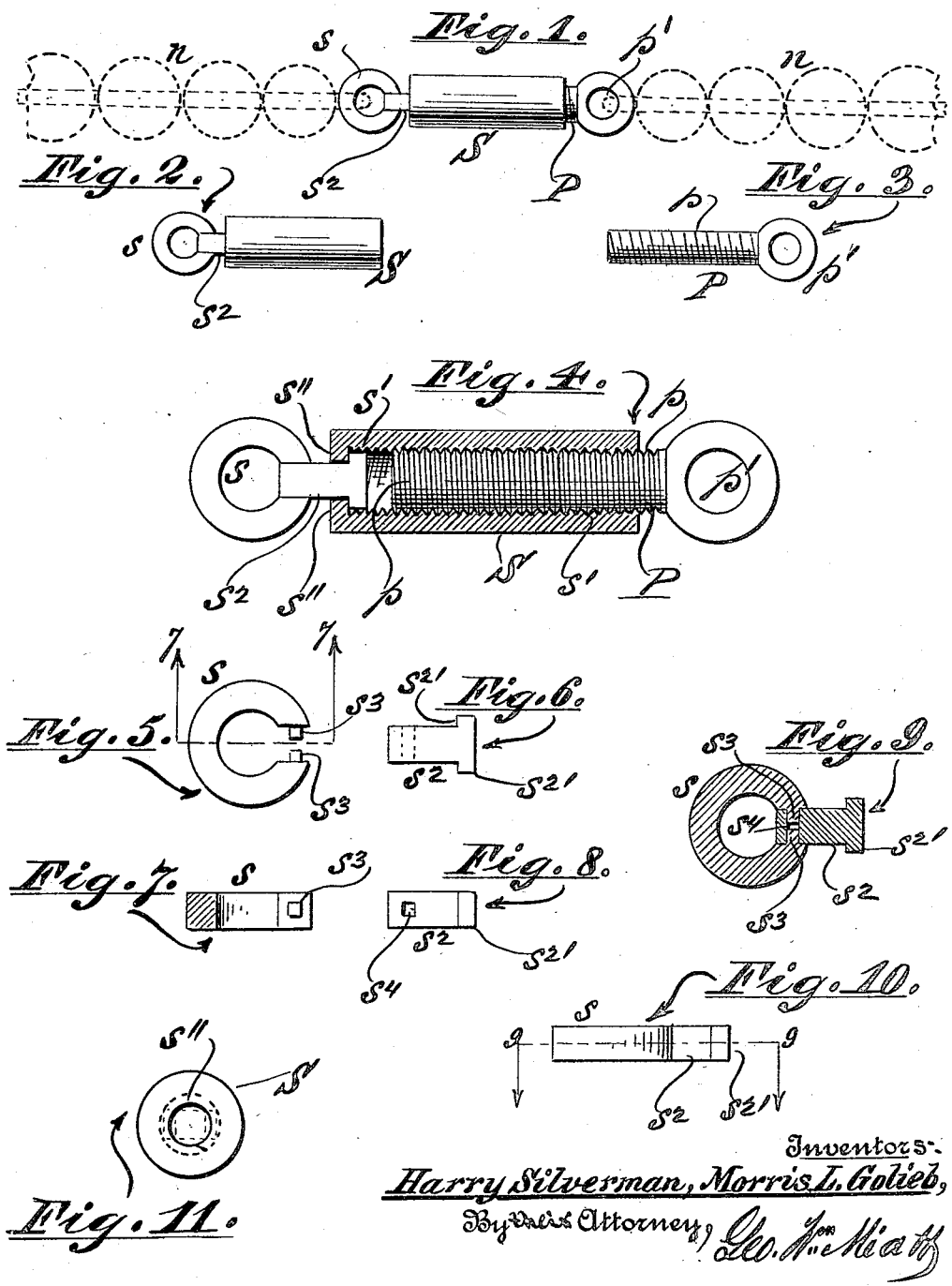

HARRY SILVERMAN, OF BROOKLYN, AND MORRIS L. GOLIEB, OF NEW YORK, N. Y.

FASTENING DEVICE FOR NECKLACES, ETC.

1,410,770. Specification of Letters Patent. Patented Mar. 28, 1922.

Application filed November 4, 1921. Serial No. 512,703.

*To all whom it may concern:*

Be it known that we, HARRY SILVERMAN, a citizen of the United States, and a resident of the borough of Brooklyn, county of Kings, city and State of New York, and MORRIS L. GOLIEB, a citizen of the United States, and a resident of the borough of Manhattan, city, county, and State of New York, have invented certain new and useful Improvements in Fastening Devices for Necklaces, Neck Chains, Etc., of which the following is a specification.

Our improvements relate to means for securing together the ends of necklaces, neck-chains, and similar articles of neckwear, and are designed to afford positive protection against accidental or surreptitious uncoupling of such parts, it being a well known fact in the art that spring-snap and other forms of catches heretofore used for the purpose have been inadequate in this respect, and that the loss of neckwear of this class has in the past been a serious detriment to the use thereof.

We obviate this difficulty effectively by our invention, which consists essentially in the specific construction and arrangement of coupling parts herein described and claimed, a distinctive feature being the screw-coupling means employed for insuring absolute attachment of the ends of the neck-circlet, substantially as hereinafter set forth.

In the accompanying drawings our coupling means, and the component parts thereof, are necessarily shown on an enlarged scale for convenience of illustration, whereas in practice the device may be made of relatively small size,—much smaller in fact than is possible with spring and other forms of catches heretofore known and used for the purpose, which fact is one of the incidental advantages attained by our invention.

Fig. 1, is an elevation of our screw coupling for the ends of neck circlets,—the fastening being complete, and the ends of a bead necklace being indicated in dotted lines;

Fig. 2, is an elevation of the screw socket member;

Fig. 3, is an elevation of the screw coupling pin member;

Fig. 4, is a central longitudinal sectional elevation, upon a still larger scale, of the parts as shown in Fig. 1;

Fig. 5, is a detail view of the swivel loop;

Fig. 6, is a detail view of the swivel shank;

Fig. 7, is a section taken upon plane of line 7—7, Fig. 5;

Fig. 8, is a view of the swivel shank taken at right angles to Fig. 6;

Fig. 9, is a central longitudinal section of the swivel member, taken upon plane of line 9—9, Fig. 10;

Fig. 10, is an elevation of the swivel member taken on a plane at right angles to the plane of Fig. 4;

Fig. 11, is an elevation of the swivel end of the screw socket member.

Our improved neck circlet fastening consists primarily of a screw socket member S, threaded internally, and provided at one extremity with a loop $s$, for the attachment of an end of a necklace or neck circlet $n$, as the case may be; and secondarily, of a screw coupling pin P, the shank of which is peripherally threaded, as at $p$, with a male thread corresponding to, and for engagement with, the female screw thread $s'$, of the socket member S, as shown more particularly in Fig. 4, of the drawings,—said coupling pin P, being also formed with an eye or loop $p'$, for the attachment of an extremity of a neck circlet $n$, as indicated in Fig. 1.

By preference the loop $s$, of the socket member S, is provided with a swivel shank $s^2$, so as to facilitate the turning of the socket member S, upon the threaded shank of the coupling pin P, in either direction, for the purpose of attachment or detachment, as the case may be.

As one of our objects is to attain a construction of coupling device of this character in which all soldering of parts is eliminated, we prefer to make our swivel loop $s$, $s^2$, in the following manner, reference being had particularly to the last six figures of the drawings. Thus a split loop $s$, is formed at its ends with tenons $s^3$, $s^3$, adapted to fit into the recesses ($s^4$) end of the swivel shank $s^2$, the loop being sprung or opened up sufficiently for the purpose and then closed against and upon the said recessed end of the swivel shank $s^2$, as shown more particularly in Fig. 9, so as to make a permanent connection therewith. The other or inner end of the swivel shank $s^2$, is upset or otherwise shouldered, as at $s^{21}$, to engage with the inturned shoulders $s''$, on this extremity of the socket member S, as shown more particularly in Fig. 4, of the drawings, it being understood of course that said swivel shank is inserted within and through the socket member S, before the split loop $s$, is applied to the outer mortised end of the shank $s^2$, as hereinbefore set forth. By this means a very simple, cheap but substantial form of swivel connection is attained, by mechanical means only, and without the use of solder, welding or analogous treatment.

Furthermore, by this method of construction we are enabled to attain a relatively small coupling device of relatively great strength; and to eliminate the use of springs, or snaps of any kind, which are not sufficiently positive in character, and are also subject to deterioration from wear, as well as to accidental disconnection. The use of the screw coupling pin P, also, is a safeguard and protection against both accidental or unlawful disconnection of the ends of the circlet, because a considerable number of rotations of either the said coupling pin P, or of the socket member S, are indispensable in order to either couple or uncouple the parts, so that the purloining of the neck circlet from the person of a wearer is rendered practically impossible under ordinary conditions of use.

We have herein shown the socket piece as of cylindrical form, although we do not limit ourselves to the specific configuration of parts shown in the drawings, since it is obvious that modifications may be resorted to without departing from the spirit and intent of our invention in this respect, and also that our new coupling device may be used in connection with various other articles of personal wear such as watch chains, bracelets, etc., with like advantageous results.

It is to be understood that by the term "loop" as used herein we wish to include not only eyelets $s$ and $p$, such as shown in the drawing, but also any equivalent means of attachment to the ends of a neck circlet or analogous article or flexible ligament for personal wear.

What we claim as our invention and desire to secure by Letters Patent is,

As an article of manufacture, a fastening device comprising a hollow screw-threaded socket member open at one end and shouldered at the other end, a screw-threaded coupling pin adjustably engaged in the open end thereof, and a swivel loop member held in the other end of said socket member, the shank thereof being insertable through the open end of said socket member and the loop detachably engaged therewith.

HARRY SILVERMAN.
MORRIS L. GOLIEB.

Witnesses:
DOROTHY M. CARMICHAEL,
GEO. WM. MIATT.